Aug. 30, 1949.  V. E. PRATT ET AL  2,480,767
FILM PROCESSOR

Filed Aug. 30, 1945  4 Sheets-Sheet 1

INVENTORS
VERNEUR E. PRATT
GEORGE F. GRAY
BY

ATTORNEYS

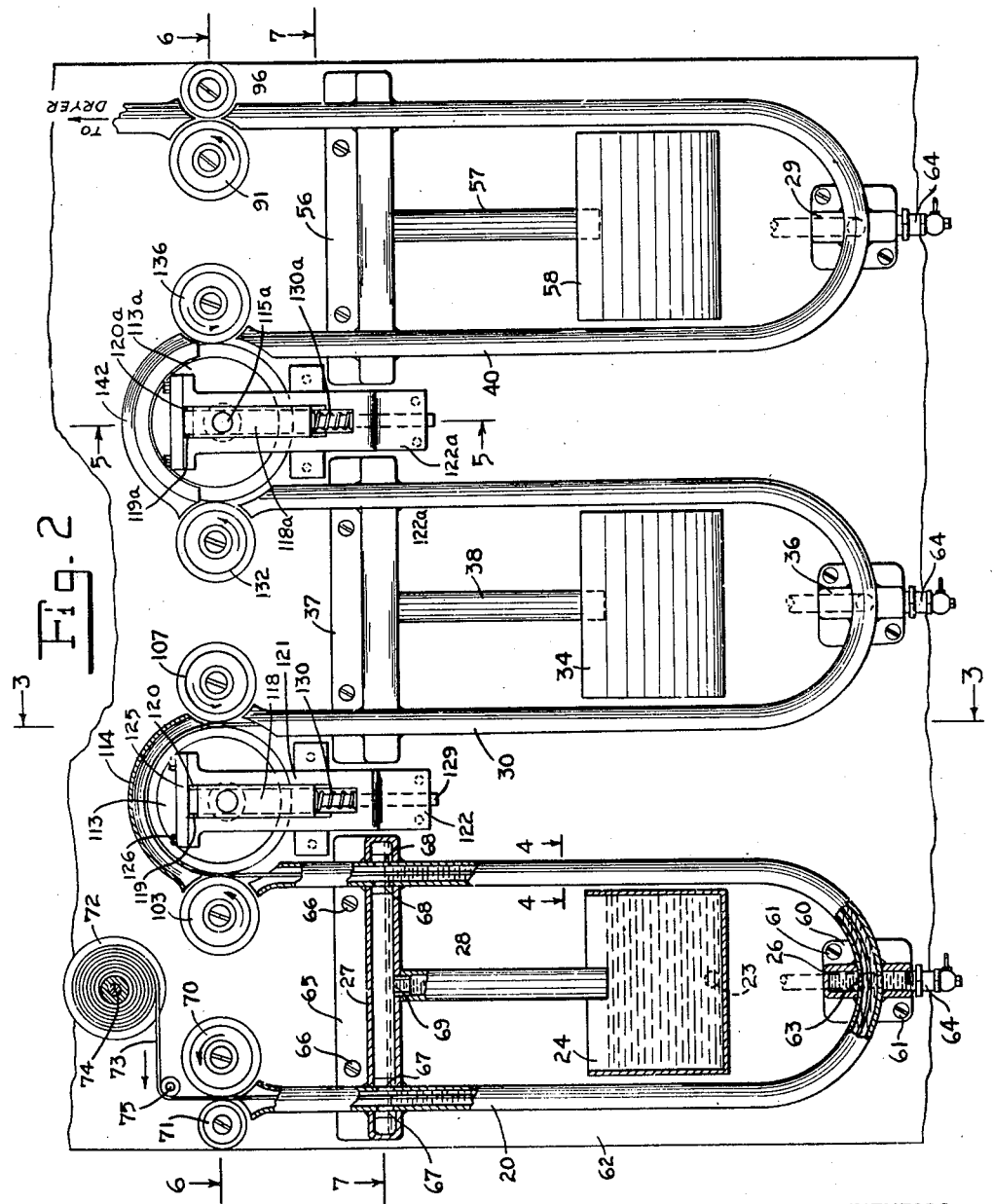

Aug. 30, 1949.　　　V. E. PRATT ET AL　　　2,480,767
FILM PROCESSOR
Filed Aug. 30, 1945　　　4 Sheets-Sheet 3
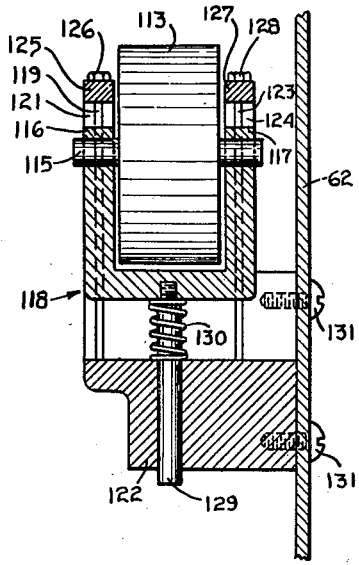
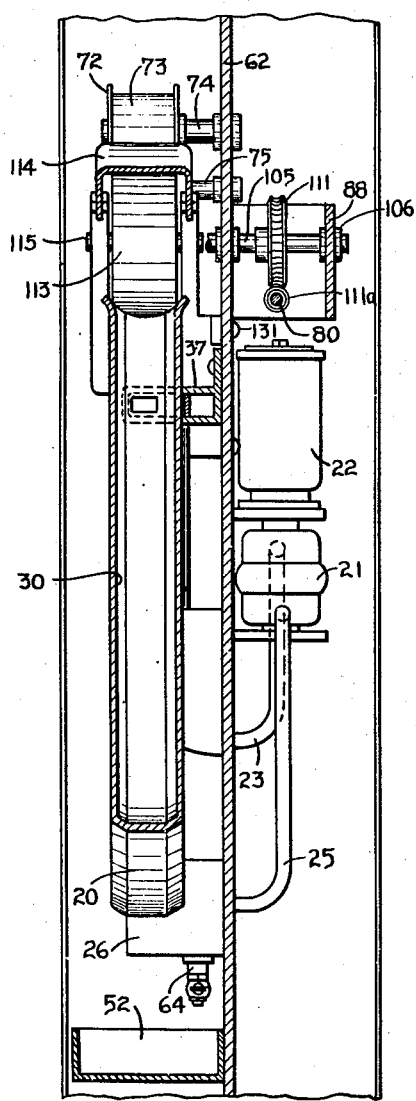
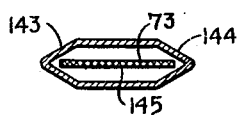
INVENTORS
VERNEUR E. PRATT
GEORGE F. GRAY
BY
*Van Deventer + Grier*
ATTORNEYS Aug. 30, 1949.  V. E. PRATT ET AL  2,480,767
FILM PROCESSOR
Filed Aug. 30, 1945  4 Sheets-Sheet 4
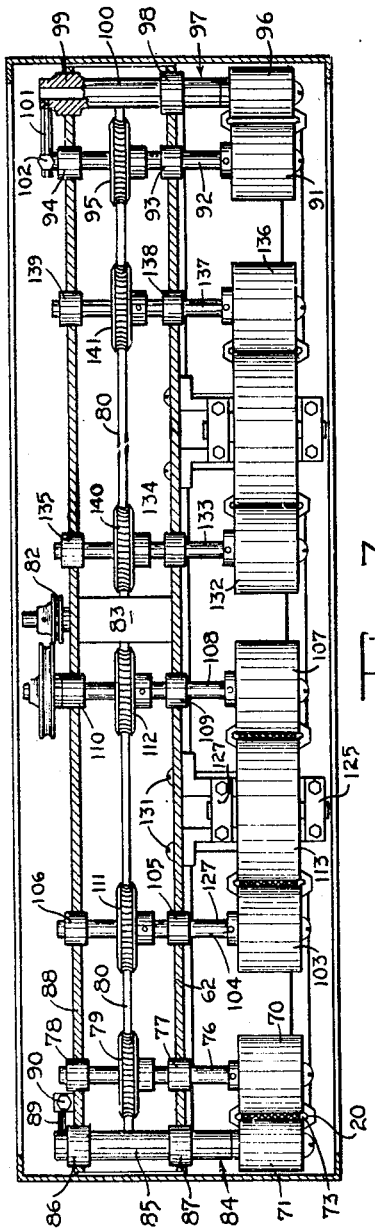
INVENTORS
VERNEUR E. PRATT
GEORGE F. GRAY
BY
Van Deventer + Gray
ATTORNEYS Patented Aug. 30, 1949

2,480,767

UNITED STATES PATENT OFFICE 2,480,767

FILM PROCESSOR

Verneur E. Pratt and George F. Gray,
Norwalk, Conn.

Application August 30, 1945, Serial No. 613,651

12 Claims. (Cl. 271—2.3)

This invention relates to improvements in film processors wherein the film to be processed is moved through a series of conduits through which the several fluids employed in the processing are circulated, and is directed more particularly to the method of transporting the film through said conduits in the form of free loops and maintaining said loops in predetermined lengths.

This application is a continuation-in-part of our co-pending application Serial Number 573,-438, filed January 18, 1945, now Patent Number 2,424,052, dated July 15, 1947.

In said co-pending application, several closed track guides are employed, and the film is propelled through these guides by cooperative rollers. These guides have the proper chemical solutions circulated therethrough, thereby eliminating the use of tanks and festooned leaders for guiding the film through such tanks. The film passes between cooperative rollers and is guided along predetermined paths by the guides referred to, so that as the leading end of the film traverses each tube or guide, it is engaged by the next set of cooperative rollers and is guided through the next tube or guide.

The rollers in said co-pending application have their peripheries spaced apart a distance greater than the thickness of the film and less than the thickness of a thick leader attached to the film, so that they engage and drive the leader and this pulls the film over the rollers in the series.

According to the present invention, between the exist of one conduit or guide and the entrance to the succeeding conduit or guide, is provided a set consisting of two drive rollers spaced apart from each other, and these rollers are contacted by a free roller which is spring loaded and is therefore urged into contact with the drive rollers with substantially the same force. One set is provided between each conduit or guide. At the beginning of the series of conduits a single drive roller is provided, and cooperating with this roller is a free roller. All of the rollers are covered with resilient or rubber-like material, and the free roller is adjusted relative to the drive roller to cause them to drive the film without slipping. The same thing is duplicated at the end of the series of conduits, so that over all, the film is fed into the series and removed therefrom at the same rate.

Now, due to the fact that the intermediate sets of rollers are controlled under the urge of spring means, the several loops of film therebetween are automatically adjusted. In other words, if any given loop becomes tighter or shorter than it should be, it counteracts the urge of the spring means and moves the free roller away from the drive rollers. This corrects the length of the loop, the spring means is again effective, and the set drives the film.

An important object of the invention is the provision of a processor including a plurality of U-shaped conduits through which the film is propelled, and means between said conduits controlled by the length of the loops of film in said conduits for automatically lengthening any of said loops which become unduly short.

A further object of the invention is the provision of a processor for films which includes a plurality of substantially U-shaped conduits through which the several fluids employed in the processing may be circulated, and means for automatically maintaining loops of film in said conduits of not less than certain predetermined lengths, thereby enabling an operator with no knowledge of film processing to operate the same.

Referring to the drawings, which are given merely by way of example to illustrate the invention:

Figure 2 is an elevation of a panel in said processor showing the several U-shaped conduits and the drive and free rollers for conveying the film therethrough;

Figure 3 is an elevation partly in section taken along the line 3—3 of Figure 2;

Figure 4 is a view showing a cross section of the conduits;

Figure 5 is an enlarged fragmentary view partly in section showing one method of spring loading the free rollers;

Figure 6 is a plan view taken along the line 6—6 of Figure 2 showing one method of driving all of the driven rollers in unison, showing the relation of the free rollers to certain of the drive rollers and the adjustment of others of the free rollers relative to the end drive rollers; and Figure 7 is a plan view taken along the line 7—7 of Figure 2.

Figure 1:
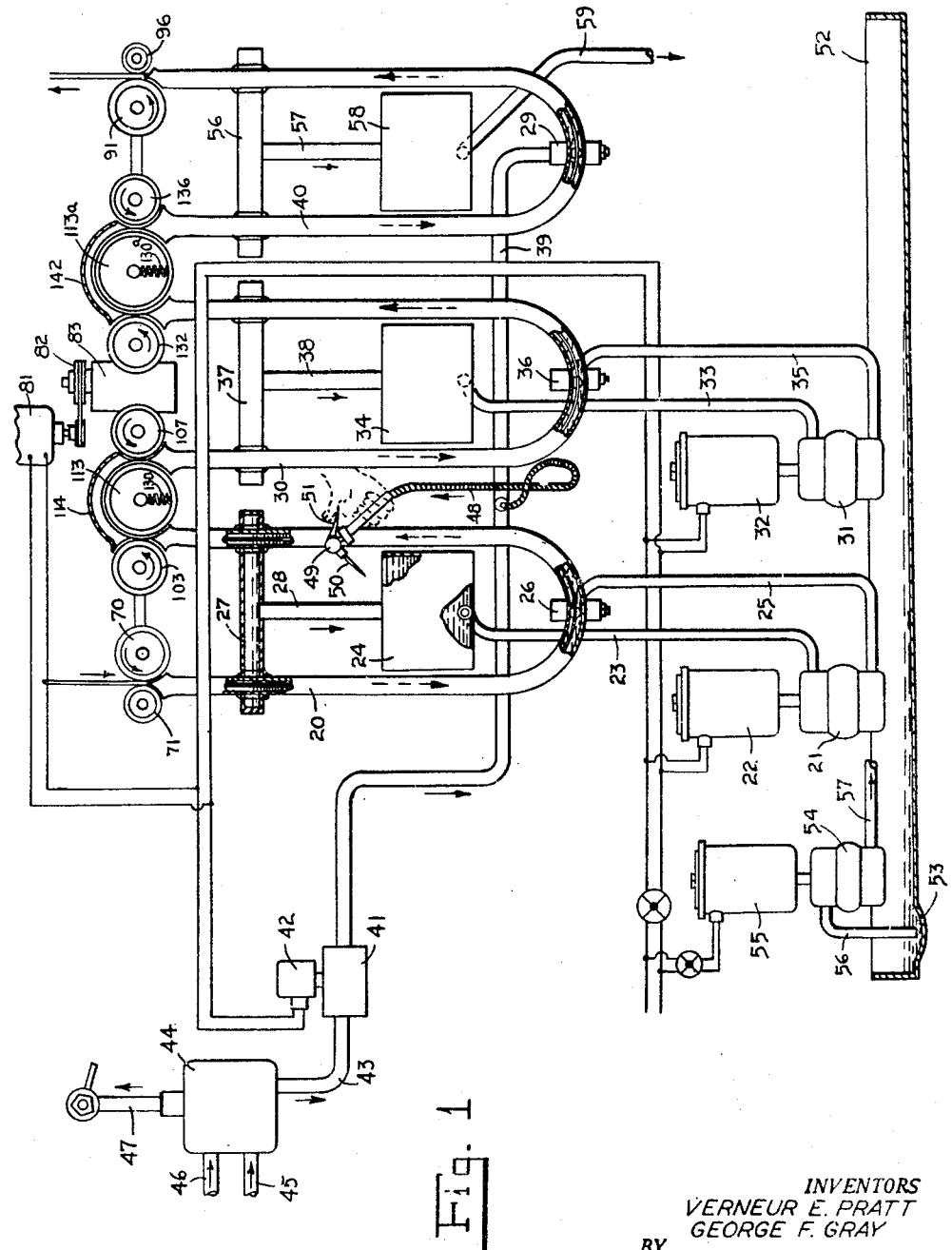
Figure 1 is a diagrammatic representation of a processor according to the present invention.

Referring first to Figure 1, our new and improved processor includes a U-shaped conduit 20 through which processing fluids circulate by means of a pump 21 driven by a motor 22. The inlet of the pump is connected via a conduit 23 to an open chamber or tank 24. The outlet of the pump is connected via a pipe 25 to a hollow fitting 26 at the bottom of the U-shaped conduit 20, suitable passages to be presently described being provided therebetween. The fluid, passing up both legs of the U, overflows into a manifold 27 through holes to be presently described, and from the manifold 27 the fluid passes via a pipe 28 into the open tank 24. Spaced apart from the U-shaped conduit 20 is a second like conduit 30 through which another processing fluid may be circulated by means of a pump 31 driven by an electric motor 32. The inlet of the pump 31 is connected via a pipe 33 to the bottom of an open tank 34. The outlet of the pump 31 is connected via a pipe 35 to a hollow fitting 36 at the bottom of the U-shaped conduit 30, suitable passages to be presently described being provided therebetween. The fluid, passing up both legs of the U, overflows into a manifold 37 through holes to be presently described, and from the manifold 37 the fluid passes via a pipe 38 into the open tank 34.

Spaced apart from the U-shaped conduit 30 is a third U-shaped conduit 40 through which washing water circulates. A hollow fitting 29 is secured to the bottom of the U-shaped conduit 40, suitable passages to be presently described being provided therebetween. A pipe 39 has one end connected thereto, and the other end is connected to a solenoid valve 41 which is operated by a solenoid 42. The valve 41 is connected via a pipe 43 to a mixing valve 44 for mixing hot and cold water together, and thereby to deliver water at a predetermined temperature. A pipe 45 is connected to the mixing valve 44 for delivering water thereto from a source of cold water under pressure. A pipe 46 is connected to the mixing valve 44 and to a source of hot water under pressure. The mixing valve is also provided with a thermostatic control 47 which automatically controls the temperature of the water delivered via the pipe 39. A flexible conduit 48 is connected to the pipe 39 and carries on its upper end a valve 49 carrying a nozzle 50 and a valve lever 51. When the lever 51 is depressed water discharges from the nozzle 50. This nozzle may be employed for delivering water to the open tanks 24 and 34. It may also be used for washing or flushing off the exteriors of all of the tanks and processing conduits.

A drain pan 52 is provided to catch fluids dumped from the conduits 20 and 30, and also to catch flushing water. This drain pan is provided with a sump 53 at one end thereof and it slants so that all fluid will move toward the sump end. A pump 54, driven by a motor 55, has an inlet pipe 56 which terminates in the sump 53, and an outlet pipe 57 which may be connected to the sewer.

Referring again to the U-shaped conduit 40, washing water is delivered from the pipe 39 to the hollow fitting 29, and rises up both legs of the U to overflow into the manifold 56. The water then passes via the pipe 57 into the open tank 58 and thence via pipe 59 into the sewer.

The film conveying system above the open ends of the U-shaped conduits will be described in detail in connection with Figures 2, 3, 5 and 6. Referring first to Figure 2, the U-shaped conduit 20 is shown partly in section. The hollow fitting 26 has a flange 60 carrying holes through which screws 61 extend for connecting the same to a vertical support plate 62. Aligned holes 63 formed in the bottom of the U communicate with the hollow interior of the fitting 26, and a dump valve 64 threadedly engages the fitting 26 and communicates with the interior thereof so that the conduit may be drained whenever desired. The manifold 27 carries a flange 65 with holes therein through which screws 66 extend for securing the same to the support 62. In one leg of the conduit 20 are formed aligned holes 67 which communicate with the hollow interior of the manifold 27. Likewise the other leg has aligned holes 68 formed therein which also communicate with the interior of the manifold. A bushing 69 mounted in a hole in the bottom of the manifold supports the pipe 28 so that fluids may flow from the manifold 27 to the open tank 24.

The U-shaped conduit 30, together with its fitting 36 and manifold 37, and the conduit 40 together with its fitting 29 and manifold 56 are identical with the conduit 20 and its fitting and manifold, therefore, the description need not be repeated.

It was pointed out above that the tanks 24 and 34 are connected to the inlets of pumps 21 and 31, respectively, and that the fittings 26 and 36 are connected to outlets or discharge ports of the same respective pumps, and also that the fitting 29 was connected to a source of mixed washing water and that the outlet of the tank 59 is led to the sewer.

Disposed above the open ends of the conduits 20, 30, and 40 is an array for propelling the film through these conduits and maintaining substantially equal loops in them. Above the left leg of the conduit 20, as seen in Figure 2, is a drive roller 70 and a cooperating free roller 71. A reel 72 carrying film 73 is positioned on a shaft 74. The film passes over a roller 75 and thence between rollers 70 and 71.

Referring to Figure 6, the roller 70 is carried on a shaft 76 journalled in bearings 77 and 78. Keyed to the shaft 76 is a worm gear 79 which meshes with a worm carried by the shaft 80. The shaft 80 is driven at reduced speed by means of a motor 81 (shown only in Figure 1) which is belted to a pulley 82 on a speed reducer 83. The roller 71 is journalled on a stud forming an extension of the body 84. The body 84 has eccentric portions 86 and 87 spaced apart from each other by a portion 85 of reduced diameter therebetween. These eccentrics are supported in a plate 88 and in the plate 62, respectively, the plate 88 being spaced apart from the plate 62.

Connected to the body 84 is a lever 89 associated with screw means 90, by means of which the body may be adjusted to move the roller 71 relative to the roller 70. The screw means 90 is adjusted so that the space between the rollers 70 and 71 is slightly less than the thickness of the film so that the rollers will always drive the film.

Positioned above the right leg of the conduit 40 is a driven roller 91 which is secured to a shaft 92 journalled in bearings 93 and 94. Keyed to the shaft 92 is a worm gear 95 which meshes with a worm carried by the shaft 80. In cooperative relation with the roller 91 is a free roller 96. A body 97 has an extension upon which the roller 96 is journalled. The body 97 also has eccentric portions 98 and 99 with a portion 100 of reduced diameter therebetween. The eccentric 98 is mounted in the plate 62 and the eccentric 99 is mounted in the plate 88. A lever 101 is connected to the body 97 and associated with screw means 102 by means of which the body may be adjusted to move the roller 96 relative to the roller 91. These rollers are adjusted a distance apart slightly less than the thickness of the film so that they will always drive the film.

The rollers 70 and 71 have been described as disposed above the left leg of the conduit 20, which is the beginning of the series of conduits through which the film passes to be processed, and the rollers 91 and 96 have been described as positioned above the right leg of the conduit 40, which is the last of the series. Therefore, the film is delivered to the series and removed from the series at exactly the same rate, because the drive rollers 70 and 91 are identical.

Continuing with Figures 2 and 6, a roller 103, the right edge of which is in line with the axis of the open end of the right leg of the U-shaped conduit 20, is keyed to a shaft 104 which is journalled in bearings 105 and 106 mounted respectively in the plates 62 and 88.

Spaced apart from the roller 103 is a roller 107, the left edge of which is substantially tangent to the axis of the left leg of the U-shaped conduit 30. This roller is keyed to a shaft 108 which is journalled in bearings 109 and 110 mounted respectively in plates 62 and 88. Keyed to the shaft 104 is a worm gear 111 which meshes with a worm on the shaft 80. Keyed to the shaft 108 is a worm gear 112 which meshes with a worm carried by the shaft 80. The worm and the worm gear 111 are arranged to rotate the roller 103 in a counterclockwise direction, and the worm and worm gear 112 are also arranged to rotate the roller 107 in a counterclockwise direction.

A free roller 113 normally bears against the rollers 103 and 107 with its center below a line joining the axes of the rollers 103, 107. When the film 73 passes up the right leg of the conduit 20 it enters between the roller 103 and the roller 113 and is guided by the inverted shield 114 to cause it to enter between the roller 113 and the roller 107. This causes the roller 113 to move downwardly against its spring load, as will presently be described, due to the fact that the thickness of the film is interposed between the rollers 103 and 113 on one side, and between the roller 113 and the roller 107 on the other side. In case the loop of film in the U-shaped conduit 20 between the rollers 70, 71 and the rollers 103, 113 becomes shortened, the roller 113 is pulled downwardly against the urge of its spring and, accordingly, the roller 103 ceases to drive the film. Due to the fact that roller 103 ceases to remove film from the U-shaped conduit and the rollers 70, 71 continue to deliver film to the conduit 20, the loop in this conduit becomes longer and allows the roller 113 to move upwardly and re-engage the roller 103 with the film therebetween. From the above explanation it can be seen that the loop of film in the conduit 20 automatically becomes lengthened any time it becomes too short.

The roller 113, referring now to Figures 2 and 5, is mounted on a shaft 115 which is journalled in the legs 116 and 117 of a yoke 118. The leg 116 has oppositely disposed grooves formed therein, which slidably engage tongues 119 and 120 formed in the bifurcated leg 121 of a support 122. Likewise, the leg 117 has oppositely disposed grooves engaging tongues, one of which is shown at 123, formed in the bifurcated leg 124 of the support 122. The leg 121 is flanged at the top and is spanned by a member 125 and secured thereto by means of bolts 126. The leg 124 is spanned by a member 127 which is secured thereto by means of bolts 128. The tongues 119 and 123 guide the yoke 118 vertically. Secured to the yoke 118 and extending downwardly through a hole in the support 122 is a rod 129. Embracing the rod 129 and positioned between the yoke 118 and the support 122 is a spring 130. The support 122 is secured to the plate 62 by means of screws 131. Thus, the spring 130 urges the roller 113 into contact with the rollers 103 and 107 and, as stated above, when the film enters between the roller 103 and the roller 113, and also between the roller 113 and the roller 107, the roller 113 is moved downwardly against the urge of the spring 130.

A roller 132, having its right edge tangent to the axis of the right leg of the U-shaped conduit, is keyed to a shaft 133 which is journalled in bearings 134 and 135 mounted in the plates 62 and 88, respectively. Spaced apart from the roller 132 and having its left edge tangent to the axis of the left leg of the U-shaped conduit 40 is a roller 136 which is keyed to a shaft 137 journalled in bearings 138 and 139 carried on the plates 62 and 88 respectively.

Keyed to the shaft 133 is a worm gear 140 which meshes with a worm carried by the shaft 80 for rotating the roller 132 in a counterclockwise direction, as viewed in Figure 2. The shaft 137 has keyed thereto a worm gear 141 which meshes with a worm carried by the shaft 80 for rotating the roller 136 in a counterclockwise direction. Resiliently bearing against rollers 132 and 136 is a free roller 113a which is identical with the free roller 113. This roller has a shaft 115a which is journalled in the two legs of a yoke member 118a. The yoke member has on each of its legs oppositely disposed grooves which engage and are guided by tongues 119a and 120a formed in the bifurcated leg 121a of the support 122a. Since this arrangement is identical with the supports for the roller 113, it is not deemed necessary to repeat the description. Therefore, the corresponding parts are given the same numeral followed by the alphabetical letter "a". Thus, the spring 130a urges the roller 113a into contact with the driven rollers 132 and 136. As the film leaving the right leg of the conduit 30 enters between the roller 132 and the free roller 113a, the roller 113a is moved downwardly against the urge of the spring 130a, and as the end of the film is guided by the inverted guide 142, it enters between the roller 113a and the roller 136 against the urge of the spring 130a, and the end of the film is delivered to the left leg of the conduit 40. As the free end of the film traverses the conduit 40 it enters between the rollers 91 and 96 and passes out to a dryer.

From the above description it will be seen that there is a definite length of film between the rollers 70, 71 and the rollers 91, 96, since these rollers are so positioned relative to their mates that the film is positively driven by each set.

Now, if the length of the film in either of the three loops becomes shortened, one or the other of the rollers 113 and 113a are moved out of driven relation with the driven rollers, thus allowing the length of the loop to build up and, as soon as it becomes normal, the spring 130 or 130a, or both as the case may be, urges the rollers 113 and/or 113a into normal relation with the driven rollers.

The cross section of the U-shaped conduits is shown in Figure 4, and it will be noted that, if the loops become shortened, the edges of the film come in contact with the slanting portions 143 and 144, so when the loops do shorten, the emulsion surface 145 of the film 73 is not scratched.

Although we have herein shown and described, by way of example, one method of carrying out the invention, it is obvious that many changes may be made in the arrangements herein shown and described without departing from the spirit of the invention as set forth in the annexed claims.

What is claimed is:
1. Film handling apparatus including a pair of spaced drive rollers adapted to have a normal loop of film formed therebetween, free roller means disposed in a common plane with and cooperating with said drive rollers with the film therebetween and directly disengaged from said drive rollers by said loop when the latter becomes shortened for causing the drive rollers to cease driving the film until the length of said loop increases to normal.

2. In processing apparatus, a U-shaped conduit, a pair of rollers positioned in line with one open end of said conduit and adapted to deliver film thereto, and a second pair of rollers positioned above the other open end of said conduit and adapted to remove film therefrom, thereby forming a normal loop of film therebetween, said last pair of rollers including a drive roller and a free roller adapted to urge the film into driving contact with said drive roller, said free roller being adapted to be pulled in a direction against its urge by said loop when the loop becomes shortened, thereby causing said second pair of rollers to cease removing film from said conduit until the loop regains its normal length.

3. In processing apparatus, a film conveying system including a plurality of vertical U-shaped conduits disposed in a common plane and having inlet legs and outlet legs formed in a series, cooperating drive and free rollers adapted to deliver film to the inlet leg of the first conduit in said series at a predetermined rate, like drive and free rollers adapted to remove film from the outlet leg of the last conduit in said series at the same rate, a plurality of drive and free rollers associated with each pair of adjacent outlet and inlet legs of the conduits of said series intermediate the ends thereof for receiving film from the outlet leg of each preceding conduit to the inlet leg of its succeeding conduit, and means urging said last free rollers into driven relation with said last drive rollers with the film therebetween, thereby forming a series of substantially equal moving free loops within said conduits, the shortening of any one of which is adapted to nullify the driving relation of the film with the drive roller removing film therefrom.

4. In processing apparatus, a film conveying system including a series of vertical U-shaped conduits disposed in a common plane, cooperating drive and free rollers adapted to deliver film to one leg of the first conduit in said series at a predetermined rate, cooperating driving and free rollers above the leg of the last conduit in said series for removing film therefrom at the same rate, cooperating drive and free rollers associated with each pair of adjacent legs of the conduits of the series intermediate the ends thereof for receiving film from one leg of the preceding conduit to the leg of the succeeding one, whereby said system forms a series of free loops of normal length in said conduits, said intermediate free rollers including means for urging them into driving contact with their associated drive rollers with the film therebetween, any of them upon becoming shortened being adapted to pull an associated intermediate free roller against its means for urging and out of said driving contact until said last loop regains its normal length.

5. In processing apparatus, a U-shaped conduit having open ended legs extending upwardly, a drive roller positioned above and having its circumferential face tangent to a plane extending through the end of one of said legs, a free roller cooperating with said drive roller, said rollers being adapted to deliver film to said leg at a predetermined rate, a second drive roller positioned above the end of the other of said legs and having its circumferential face tangent to a plane extending through said last leg, a free roller movably positioned adjacent to said second drive roller, spring means urging said last free roller into contact with said last drive roller, said last rollers being adapted to remove film from said conduit, thereby forming a normal loop of film within said conduit, said last free roller being adapted to be pulled in a direction against the urge of said spring means by said loop when the latter becomes shortened, thereby causing said second pair of rollers to cease removing film from said conduit until the loop regains its normal length.

6. In processing apparatus, a film conveying system including a plurality of U-shaped conduits disposed in a common plane and having open ended outlet and inlet legs extending upwardly and formed in a series, cooperating drive and free rollers adapted to deliver film to the inlet leg of the first conduit in said series at a predetermined rate, like drive and free rollers adapted to remove film from the outlet leg of the last conduit in said series at the same rate, a plurality of sets of drive and free rollers associated with each pair of adjacent outlet and inlet legs of the conduits of said series intermediate the ends thereof for receiving film from the outlet of each preceding conduit and delivering it to the inlet leg of its succeeding conduit, film guide means spanning each free roller in each of said sets, and individual means urging the free rollers in each set into driven relation with the drive rollers in its set with the film therebetween, whereby all said rollers cooperate to form a series of substantially equal moving free loops within said conduits, the shortening of any one of which is adapted to nullify the driving relation of the film with the drive roller removing film therefrom.

7. In processing apparatus, a support, a film conveying system thereon including a plurality of U-shaped conduits disposed in a common plane and having open ended outlet and inlet legs extending upwardly and formed in a series, a series of drive rollers all substantially equal in diameter disposed on a line above said legs, the drive rollers above the inlet legs of said conduits having their peripheral faces on one side thereof tangent to planes extending from said inlet legs, the drive rollers above the outlet legs of said conduits having their opposite peripheral faces tangent to planes extending from the ends of said outlet legs, a free roller positioned in cooperative relation with the first drive roller on said line for delivering film to the inlet leg of the first conduit in said series, a second free roller in cooperative relation with the last roller on said line for removing film from the outlet leg of the last conduit in said series, and intermediate free rollers each adapted to cooperate with both a drive roller above the outlet of one of said conduits and a second drive roller above the inlet leg of the next succeeding conduit, said intermediate free rollers being movably mounted on said support, and spring means urging said intermediate rollers into driving contact with said last drive rollers with the film therebetween, said rollers being adapted to form a series of substantially equal moving free loops of film within said conduits, the shortening of any one of which is adapted to act against the spring means of an intermediate free roller associated therewithin and cause the removal of film from the shortened loop to cease until it regains its normal length.

8. In processing apparatus, a support, a film conveying system thereon including a plurality of U-shaped conduits disposed in a common plane and having open ended outlet and inlet legs extending upwardly and formed in a series, a plurality of drive rollers all substantially equal in diameter disposed on a line above said legs, those of the drive rollers above the inlet legs of said conduits each having its peripheral face on one side thereof tangent to a plane extending from a different one of said inlet legs, those drive rollers above the outlet legs of said conduits each having its opposite peripheral face tangent to a plane extending from the end of a different one of said outlet legs, a free roller positioned in cooperative relation with the first drive roller on said line for delivering film to the inlet leg of the first conduit in said series, a second free roller in cooperative relation with the last roller on said line for removing film from the outlet leg of the last conduit in said series, and intermediate free rollers each adapted to cooperate with both a drive roller above the outlet of one of said conduits and a second drive roller above the inlet leg of the next succeeding conduit, said intermediate free rollers being movably mounted on said support, guide means spanning each of said intermediate free rollers for guiding the film removed from each outlet leg to the next succeeding inlet leg, and individual spring means urging said intermediate rollers into driving contact with said last drive rollers with the film therebetween, said rollers being adapted to form a series of substantially equal moving free loops of film within said conduits, the shortening of any one of which is adapted to act against the spring means of an intermediate free roller associated therewith and cause the removal of film from the shortened loop to cease until it regains its normal length.

9. In processing apparatus, film handling means including, a support, a pair of spaced drive rollers carried on said support and driven at a constant rate, a free roller movable along a fixed path on said support in a common plane with said drive rollers, said free roller being adapted to be spanned by the film and adapted to contact said drive rollers with said film therebetween and adapted to be directly disengaged from said drive rollers by the shortening of the portion of said film spanning said free rollers, and spring means supported on said support and urging said free roller toward said drive roller.

10. In processing apparatus, film handling means including, a support, a pair of drive rollers carried on said support and driven at a constant rate, a frame slidably carried on said support in a plane common with and adapted to move toward said drive rollers, a free roller rotatably supported in said frame, said free roller being adapted to be spanned by a loop of the film and adapted to be urged into contact with said drive rollers with the film therebetween, and spring means carried on said support and urging said frame and the free roller carried thereby toward said drive rollers, whereby said free roller is in contact with the drive rollers with the film therebetween as aforesaid as long as the length of said loop remains normal, said loop being adapted to physically, and against the urge of said spring means, move said free roller and the loop out of contact with said drive rollers.

11. In processing apparatus, film handling means including, a support, a pair of drive rollers journalled on said support spaced apart from one another and driven at a constant rate, a movable support carried on said first support and adapted to move along a path extending between said drive rollers, a free roller disposed in a common plane with said drive rollers, said free roller being larger in diameter than the space between said drive rollers, thereby making it impossible for said free roller to pass through the space between said drive rollers, a shaft rotatably supporting said free roller in said movable support, and spring means carried on said first support for urging said movable support and the free roller carried thereby toward said drive rollers.

12. In processing apparatus, film handling means including, a support, a pair of drive rollers journalled on said support spaced apart from one another and driven at a constant rate, a bracket secured to said support and having oppositely disposed guideways formed thereon, a yoke member carrying on opposite faces thereof guide means cooperating with said guideways, a shaft journalled in the arms of said yoke, a free roller mounted on said shaft, said free roller having a diameter greater than the space between said drive rollers, said bracket being so positioned on said support that the shaft carried by said yoke moves along a path extending between said drive rollers, and spring means between said bracket and said support for urging said yoke and the free roller carried thereby into contact with both said drive rollers.

VERNEUR E. PRATT.
GEORGE F. GRAY.

REFERENCES CITED

The following references are of record in the file of this patent:

UNITED STATES PATENTS

| Number | Name | Date |
| --- | --- | --- |
| 2,085,188 | Gerlach | June 29, 1937 |
| 2,102,843 | Gwynne | Dec. 21, 1937 |
| 2,146,170 | Brenbarger et al. | Feb. 7, 1939 |
| 2,153,552 | Eitzen | Apr. 11, 1939 |